United States Patent
Shaffer

(10) Patent No.: US 10,135,945 B2
(45) Date of Patent: Nov. 20, 2018

(54) METHODS AND SYSTEMS FOR BOUNDARY PLACEMENT IN A DATA STREAM

(71) Applicant: CISCO TECHNOLOGY, INC., San Jose, CA (US)

(72) Inventor: Gary Shaffer, Topsham, ME (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 530 days.

(21) Appl. No.: 14/155,854

(22) Filed: Jan. 15, 2014

(65) Prior Publication Data

US 2015/0201012 A1 Jul. 16, 2015

(51) Int. Cl.
*H04L 29/08* (2006.01)
*H04L 29/06* (2006.01)

(52) U.S. Cl.
CPC .......... *H04L 67/325* (2013.01); *H04L 65/605* (2013.01); *H04L 67/1095* (2013.01)

(58) Field of Classification Search
CPC ............ H04N 21/234345; H04L 65/80; H04L 65/607; H04L 65/60; H04L 65/605; H04L 67/1095; H04L 67/325; H04J 3/0661; H04W 56/001
USPC ................................................ 709/231, 248
See application file for complete search history.

(56) References Cited

U.S. PATENT DOCUMENTS

| | | | |
|---|---|---|---|
| 6,493,386 B1 | 12/2002 | Vetro et al. | |
| 6,542,546 B1 | 4/2003 | Vetro et al. | |
| 7,089,485 B2 | 8/2006 | Azadet et al. | |
| 7,792,158 B1* | 9/2010 | Cho | H04J 3/0664 370/350 |
| 8,074,094 B2 | 12/2011 | Haag et al. | |
| 8,169,916 B1 | 5/2012 | Pai et al. | |
| 8,214,741 B2 | 7/2012 | Errico et al. | |
| 8,514,705 B2* | 8/2013 | Niamut | H04L 65/80 370/231 |
| 8,532,171 B1 | 9/2013 | Narayanan et al. | |
| 8,898,717 B1 | 11/2014 | Labrozzi et al. | |
| 2002/0010917 A1* | 1/2002 | Srikantan | H04L 29/06 725/1 |
| 2007/0183462 A1* | 8/2007 | Daugherty | H04J 3/0629 370/509 |
| 2008/0133766 A1 | 6/2008 | Luo | |
| 2012/0072757 A1 | 3/2012 | Haag et al. | |
| 2012/0128061 A1 | 5/2012 | Labrozzi et al. | |

(Continued)

FOREIGN PATENT DOCUMENTS

WO WO 2008/042999 A3 4/2008

OTHER PUBLICATIONS

Pantos, et al., "HTTP Live Streaming", Oct. 14, 2013, (pp. 1-42).

(Continued)

*Primary Examiner* — Davoud A Zand
*Assistant Examiner* — Kristoffer L S Sayoc
(74) *Attorney, Agent, or Firm* — Merchant & Gould P.C.

(57) ABSTRACT

A method can include detecting a cadence-changing event for a stream of data, the stream of data being provided in chunks having associated chunk boundaries according to an established cadence. An adjusted chunk boundary can be established at a location corresponding to the cadence-changing event to replace a closest scheduled chunk boundary in the stream of data.

18 Claims, 4 Drawing Sheets

(56) References Cited

U.S. PATENT DOCUMENTS

| | | | |
|---|---|---|---|
| 2012/0155370 A1* | 6/2012 | Yeh | H04W 56/0025 370/315 |
| 2012/0265856 A1 | 10/2012 | Oran et al. | |
| 2012/0324520 A1* | 12/2012 | Van Deventer | H04L 65/605 725/109 |
| 2013/0044803 A1* | 2/2013 | Fisher | H04N 21/2343 375/240.02 |
| 2013/0064283 A1* | 3/2013 | Sun | H04N 21/2343 375/240.01 |
| 2013/0198322 A1 | 8/2013 | Oran et al. | |
| 2013/0246567 A1* | 9/2013 | Green | H04L 67/06 709/217 |
| 2013/0272374 A1 | 10/2013 | Eswara et al. | |
| 2014/0259048 A1* | 9/2014 | Brueck | H04L 65/601 725/32 |

OTHER PUBLICATIONS

U.S. Appl. No. 13/348,094, filed Jan. 11, 2012.
"HTTP Dynamic Streaming", data sheet, Adobe Systems Incorporated, 2010 (2 sheets).

* cited by examiner

METHODS AND SYSTEMS FOR BOUNDARY PLACEMENT IN A DATA STREAM

TECHNICAL FIELD

This disclosure relates to communications and, more particularly, to synchronization of streaming data.

BACKGROUND

Adaptive bitrate streaming is a technique used in streaming multimedia over computer networks. It works by employing a transcoder or encoder to adjust the quality of a video stream based on user parameters that can be detected in real time. Such encoder or transcoder can encode a single source video at multiple bitrates. In an architecture that might include multiple encoders or transcoders, such as for back-up or redundancy purposes, each encoder or transcoder needs to have its video and audio chunk boundaries properly synchronized. Synchronization can be adversely affected in response to events that can change boundary placement.

DESCRIPTION OF EXAMPLE EMBODIMENTS

Overview

This disclosure relates generally to communications and, more particularly, to synchronization of streaming data.

As an example, a method can include detecting a cadence-changing event for a stream of data, the stream of data being provided in chunks having associated chunk boundaries according to an established cadence. An adjusted chunk boundary can be established at a location corresponding to the cadence-changing event to replace a closest scheduled chunk boundary in the stream of data.

As another example, a system can include an inter-node communications link to provide communications between each of a plurality of nodes in a node group that is associated with a service. Each of the plurality of nodes can include a synchronization control configured to dynamically adjust a chunk boundary for a data stream in response to detecting a cadence-changing event. Each of the plurality of nodes can also provide a synchronization message to other nodes in the node group via the inter-node communications link. The synchronization message can include data that specifies a parameter associated with the cadence-changing event detected by the respective node to facilitate synchronization among the plurality of nodes.

As another example, an apparatus can include a synchronization control configured to maintain synchronization of chunk boundaries for an output data stream generated by the apparatus relative to at least one other apparatus in a corresponding group. The synchronization control can include an event processor configured to detect a cadence-changing event for the output data stream. The synchronization logic can be configured to dynamically insert an adjusted chunk boundary into the output data stream to replace an expected chunk boundary determined as being closest to the cadence-changing event and to provide an adjusted cadence for at least a next chunk boundary according to synchronization rules.

Example Embodiments

Figure 1:
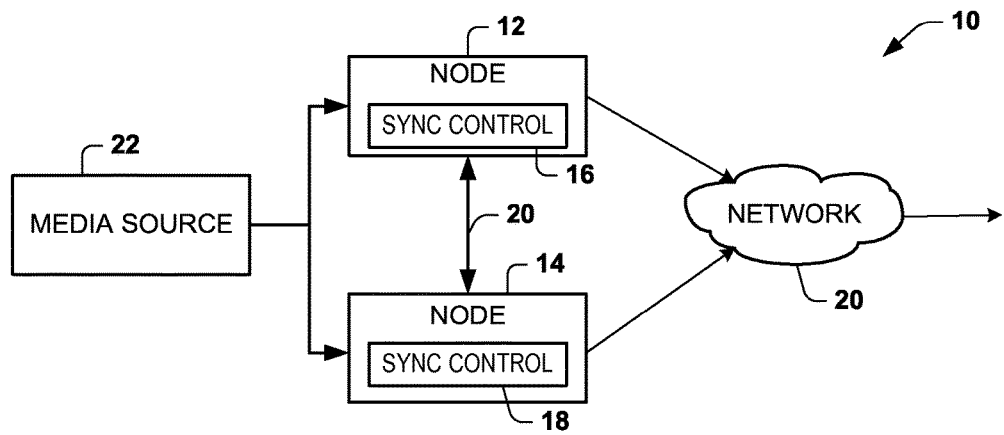
FIG. 1 depicts an example of a system that can synchronize data.

FIG. 1 depicts an example of a communication system 10 that includes a plurality of (e.g., two or more) nodes 12 and 14. Each of the nodes 12 and 14 is configured to implement synchronization control 16 and 18, respectively, for controlling synchronization of data that is provided from the nodes. Each node 12 and 14 thus can be any device capable of implementing at least a portion of the synchronization control and providing a corresponding output stream of data. Each synchronization control 16 and 18 can be implemented as hardware, software or a combination of hardware and software. In the example of FIG. 1, each node 12 and 14 is demonstrated as providing its output data stream to a network 20. For example, the output streams can be provided to a transmitter for transmission thereof or to a data storage device for later playback.

As an example, each of the nodes 12 and 14 can correspond to an adaptive bitrate (ABR) transcoding node configured to generate aligned streaming content for one or more video profiles. The content that is generated by one or more of the nodes 12 and 14 can be provided downstream for consumption by an ABR client or the content generated by such node(s) 12 and 14 can be stored in one or more non-transitory storage media (e.g., flash memory, hard disk drive or the like), such as at an origin server. Examples of ABR streaming protocols that can be utilized for generate the content for streaming each rendition of a video service can include HTTP Live Streaming (HLS), Adobe systems HTTP dynamic streaming, Microsoft smooth streaming, MPEG dynamic adaptive streaming over HTTP (DASH) or other streaming protocols.

While many examples disclosed herein describe the nodes 12 and 14 as ABR transcoding nodes for generating aligned streaming media in the context of a back-up architecture for the system (e.g., a content delivery network) 10, the nodes can be implemented to synchronize and align other types of data delivered via other mechanisms. Additionally, the respective nodes 12 and 14 can reside in different devices or can reside co-located within a given device such as on separate circuit boards of a content distribution device (e.g., other types of encoders and transcoders, digital content managers, content delivery servers, or the like). Additionally there can be any number of one or more such nodes operating in the system at any given time.

Each of the nodes 12 and 14 can ingest input content from a common media source 22, which can be a single source or include multiple distributed sources. The input content can correspond to a digital input media stream, which can be previously encoded content or unencoded original content. In some examples, the input media content to the nodes 12 and 14 can include an input transport stream of digital audio and video content, which can contain one or more video elementary streams and one or more audio elementary streams. In other examples, the nodes 12 and 14 in the system 10 can receive other forms of content data for processing and delivery in a synchronized manner.

By way of example, each synchronization control 16 and 18 can be configured to maintain synchronization of a given media asset across each output profile generated by each node 12 and 14. For instance, a given service (e.g., a video service) can include any number of transport streams, and each transport stream can include a respective content profile (e.g., also referred to as a rendition). The parameters for each profile can include codec, codec profile, video and audio bitrate, width and height, frame rate, and the like.

Each synchronization control 16 and 18 thus can be configured to compute chunk boundaries according to an established cadence for each respective profile that is followed by each synchronization control. The synchronization of chunk boundaries can be set according to a common time base, such as a time stamp (e.g., the presentation time stamp (PTS)) that can be appended to each data chunk. Thus, the nodes can be said to be in PTS synchronization if both nodes assign the same time stamp to each respective frame. If the nodes 12 and 14 assign different time stamps to a given frame, then the nodes can be considered out of synchronization.

As used herein, a chunk of content can refer to any discrete number of bits of content that can be independently encoded and decoded. For example, chunks of audio and video can be generated as segments or fragments having a prescribed duration, such as multiple seconds. Thus, a chunk boundary could also be referred herein to as a segment boundary or a fragment boundary depending on context of a given chunk. The duration of a chunk for a video service can be fixed or variable. The composition of a given stream or profile can vary depending on the ABR format implemented by the nodes 12 and 14. Each synchronization control 16 and 18 thus can implement a common set of rules to help ensure that data chunks and chunk boundaries remain synchronized for each of the nodes.

As used herein, the term "cadence" refers to the scheduled chunk boundary times (also referred to as boundary locations), such that chunk boundaries fall at deterministic locations in the data stream. The distance between adjacent chunk boundaries defines an interval, which can be fixed or variable. The cadence thus includes any offset that may be implemented relative to an established schedule for boundary locations in a given data stream. An offset (e.g., a shift from an arbitrary initial point in time) can arise, for example, in response to detecting a cadence-changing event. Such offset results in a shift in the cadence corresponding to the amount of offset due to the detected event. The cadence thus can be computed deterministically for chunk boundaries based on an established interval (fixed or variable) and any offset that has determined from an initial point in time for the data stream. In the example of FIG. 1, each synchronization control 16 and 18 schedules each chunk boundary to occur at a location established according to the cadence (e.g., schedule plus any offset), which may be as originally computed or as may be adjusted. As a further example, a cadence can be established for a data stream so that chunk boundaries are established at 0, 60, 120, etc. until a cadence changing event occurs that shifts it by, for example, 3. As a result, in this example, the new cadence would become 123, 183, 243, and so forth.

Additionally, the synchronization control 16 and 18 further can adjust chunk boundaries in response to detecting a cadence-changing event. Such boundary adjustments may be referred to herein, in some examples, as variable or dynamic boundary placement. For example, a given synchronization control 16 or 18 can be configured to insert an adjusted boundary at a location that is different from expected (e.g., based on synchronization parameters) in response to the cadence-changing event. If an ingested media stream already includes marked chunk boundaries, a closest boundary to the adjusted boundary location that is inserted can be removed also in response to the cadence-changing event. A boundary identifier can be inserted at the determined adjusted boundary location. As an example, for an ABR video stream implemented according to H.264 standard, the boundary identifier can be implemented as an instantaneous decode refresh (IDR) access unit also referred to as an IDR frame.

As an example, assuming a fixed chunk duration and in the absence of a cadence-changing event, the chunk boundaries fall at deterministic locations in the stream (e.g., at regularly spaced intervals). In response to a cadence-changing event, the synchronization control 16 and 18 can adjust the cadence according to an offset that is calculated. In some examples, the offset can be calculated based on a difference between the originally scheduled, boundary location (assuming the cadence-changing event did not occur) and the location of the adjusted boundary location in response to the cadence-changing event. Thus, the cadence can describe a sequence of scheduled boundary locations including an amount of offset, which scheduled boundary locations can be described relative to an arbitrary initial point in the timeline of the media source (e.g., modulo the nominal chunk duration). The amount of offset can thus be cumulative to adjust the cadence for any number of cadence-changing events.

Examples of cadence-changing events can include an ad splice (e.g., in or out), a program boundary, a scene change, a change in the media source driving each node to name a few. The cadence-changing events can be detected by the synchronization control 16 and 18, such as in response to an input event signal that specifies a time (e.g., a timestamp, such as a PTS) for the event. Alternatively, the cadence-changing event can be detected based on processing a signal from the media source 22 or other input signal and determining that a cadence-changing event is needed at a corresponding time.

For example, ads and other program changes can be signaled in-band (e.g., using signaling based on Society of Cable Telecommunications Engineers (SCTE) standards, such as SCTE 104 or SCTE 35) or out-of-band controls. Under normal circumstances, the nodes 12 and 14 will receive the signals identifying the cadence-changing event in advance of when the boundary insertion point is to occur. However, when an error occurs, such as if or one or more nodes does not receive or loses the signal, the nodes 12 and 14 may go out of synchronization. The synchronization controls 16 and 18 in the nodes 12 and 14 cooperate to maintain synchronization of chunk boundaries, as established by a cadence even if boundaries are dynamically shifted as disclosed herein.

To enable synchronization of data streams generated by the nodes 12 and 14, each of the nodes 12 and 14 can be configured to communicate synchronization messages, demonstrated as inter-node communications 24. For example, the inter-node communications 24 can occur over a network, which could be a serial connection between nodes, an internet protocol (IP) network, a token ring network or other form of communications. As one example, the inter-node communications 24 can occur over an IP-network in the form of a multicast user datagram protocol (UDP) message that is sent to nodes of node group associated with a respective video service.

As a further example, the synchronization control 22 and 24 can be configured to cause its node to send a synchronization message periodically and/or in response to detecting a cadence-changing event. The synchronization message can specify synchronization parameters determined by the sender node. For instance the synchronization parameters can include data specifying a time (e.g., a time stamp) of its most recently detected cadence-changing event. The parameters can also include data specifying a next chunk boundary (e.g., a time stamp) for the sender node or at least data sufficient for the recipient node to determine such next boundary.

A given recipient node can compare the synchronization parameters provided from each other node relative to like parameters of the given node. This comparison can include comparing the time associated with the most recent cadence-changing event at the other node with a time associated with a most recent cadence-changing event at the given node. This can also include comparing a next chunk boundary at the given node with a next chunk boundary at each other node. The given node can then determine if it is out of synchronization with the other node(s) based on the comparisons.

The given node further can utilize either its own next chunk boundary or the next chunk boundary for the other node depending on which node most recently experienced the cadence-changing event. For instance, if the other node has identified a more recent timestamp for a cadence-changing event, this can indicate that the given node may have missed a signaling for such event and thus is out of synchronization. In such a situation, the given node can set a chunk boundary for streaming content from the given node according to synchronization information provided from the other node. If the given node is determined to have received a more recent cadence-changing event than the other node based on the comparison, the given node can maintain the chunk boundary for streaming content from the given node according to the chunk boundary established at the given node.

Figure 2:
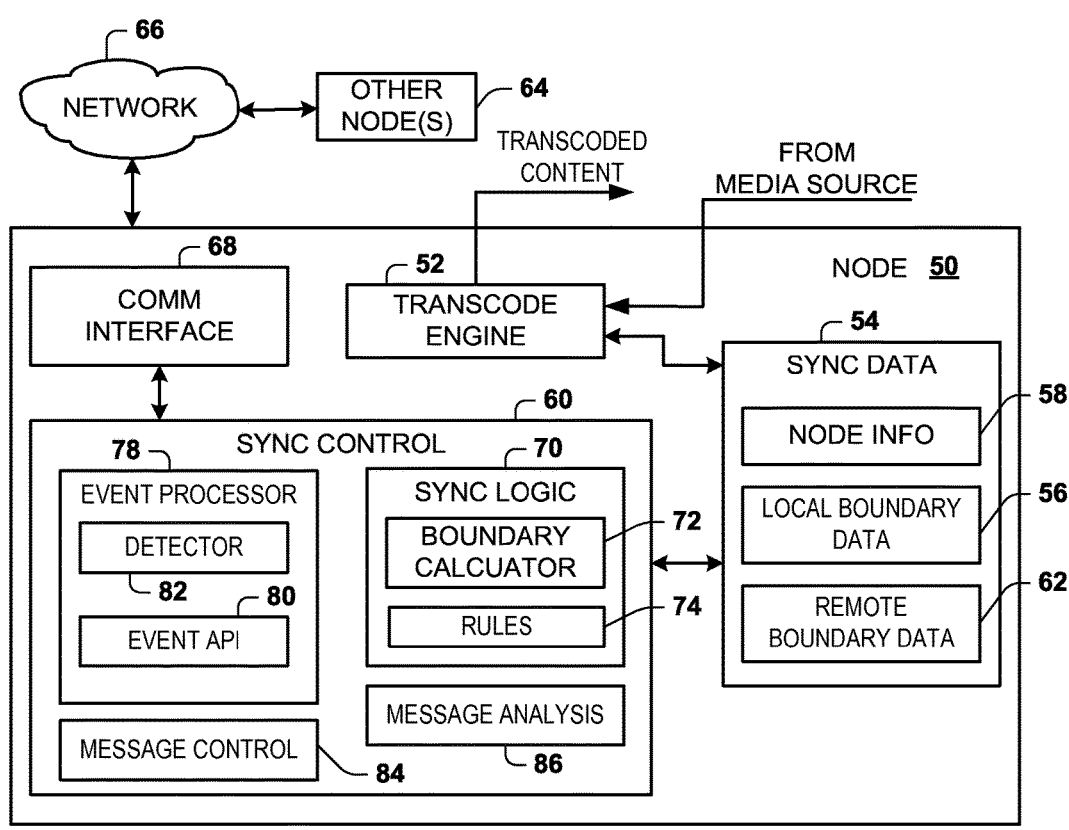
FIG. 2 illustrates an example of a node and associated logic that can be utilized to synchronize data.

FIG. 2 depicts an example of a node 50 that is configured as an ABR transcoder to transcode chunks of content data for a video service. The node 50 can correspond to one of the nodes 12 or 14 disclosed with respect to the system of FIG. 1. The node 50 includes a transcode engine 52 that is configured to transcode content from a media source based on synchronization data 54. The synchronization data 54 can include local boundary data 56, remote boundary data 62 and node information 58. The local boundary data 56 can specify current and future chunk boundary locations, such as determined by the synchronization control 60, an established chunk interval (e.g., the chunk duration), and a cadence that represents an established schedule plus any offset (positive or negative) from expected boundaries. The synchronization control 60 can correspond to the synchronization control 16 or 18 disclosed with respect to FIG. 1.

The node information 58 can uniquely identify the node 50 within a defined node group that includes plural nodes as well as specify the capabilities and protocols implemented by the node 50. The remote boundary data 62 can include boundary data that is received for one or more other nodes 64 in the corresponding system 66. For example each of the nodes 50 and 64 can communicate with each other via a network 66 and send synchronization messages that include boundary and cadence information for each respective node.

The synchronization control 60 can include synchronization logic 70 that is configured to determine chunk boundary locations based on an established cadence for the node 50. For example, the synchronization logic 70 can include a boundary calculator 72 that is configured to compute the boundary location for a given chunk of data based on the boundary of a preceding location and a cadence that has been established and stored in the synchronization data 56. The chunk interval utilized by the node 50 will be the same as the other node(s) 64 to maintain synchronization and alignment of data chunks.

The synchronization logic 70 can employ a set of synchronization rules 74 to control how synchronization is performed under a variety of circumstances, including for handling cadence-changing events. Under normal operating conditions each subsequent boundary can be computed by applying the scheduled interval and any offset relative to a preceding chunk boundary (e.g., time stamp). The synchronization logic 70 also employs the rule 74 for synchronizing chunk boundaries responsive to the occurrence of a cadence-changing event. As disclosed herein, the occurrence of a cadence-changing event can be detected in response to a signal specifying a time for such event or the synchronization logic can determine its occurrence by processing signals to determine that an insertion or removal of a chunk boundary is required. As yet another example, a cadence-changing event can be determined in response to determining that the node 50 is out of synchronization based on a synchronization message from one or more other nodes 64.

By way of example, the synchronization control 60 can include an event processor 78 that is configured to handle cadence-changing events such as disclosed herein. For example, the event processor 78 can employ an event API 80 that is utilized by external applications and/or devices to signal a time when an impending cadence-changing event is to occur. For example, such signaling can be communicated to the node 50 via the network 60 using an appropriate signaling protocol as disclosed herein. In other examples, such signaling can be provided via other mechanisms and other communication interfaces (not shown). The event processor 78 can also include a detector 82 that is configured to generate a detection signal in response to detecting the occurrence of the cadence-changing event (e.g., provide an alert or flag to the synchronization logic). The detection signal can include timing information (e.g., a PTS value) corresponding to when the cadence-changing event is to occur. As disclosed herein, cadence-changing events can include a program boundary, a scene change, a change in the data source that is driving the input or one or more other events that can specify a change in the chunk boundary of the data stream that is generated by the node 50.

The synchronization logic 70 can also employ rules 74 that can define how synchronization is to be implemented in response to the detection (e.g., by the event processor) of a cadence-changing event, which can include dynamic modification to one or more chunk boundary. For example, the rules 74 can include instruction for removing a closest chunk boundary from the data stream to the occurrence of the cadence-changing event time (e.g., PTS) and placing an adjusted chunk boundary at a location (e.g., time) corresponding to the cadence-changing event. In the examples disclosed herein, the location corresponding to the cadence-changing event is demonstrated as occurring at the time of the cadence-changing event. In other examples, the location could be shifted in time by a known amount, forward or backward in time. The rules 74 can further control how the synchronization logic 70 determines a chunk duration from the cadence-changing event to the next chunk boundary. The rules 74, for example can be different for different ABR protocols.

The synchronization control 60 can receive and send messages via a communication interface 68. The communication interface 68 can be configured to communicate with one or more other nodes 64 via a communication link, demonstrated as the network 66. For example, the network 66 utilized to communicate messages for the inter-node communications can be implemented via a transport layer protocol (e.g., TCP, UDP, stream control transmission protocol), such as can be employed for communicating multicast messages among the respective nodes of a node group assigned to a given service.

As a further example, the synchronization control 60 can also include a message control 84 that is configured to control sending messages via the communication interface 62. As disclosed herein, the message control 84 can be configured to send a synchronization message to the other node(s) 64. The message control can send the synchronization message periodically such as at a rate that commensurate with a chunk duration to provide a synchronization message with each chunk that is generated. In other examples, the synchronization message can be sent at other rates that can be greater than or less than the rate that each chunk is generated. Additionally or alternatively, the message control 84 can be configured to generate the synchronization in conjunction with detecting a cadence-changing event.

The synchronization message from the node can include synchronization information that specifies a boundary location and a chunk duration. For instance, the boundary location can specify placement of a most recent chunk boundary. The most recent chunk boundary can be a regularly scheduled boundary or, in other examples, it can specify the chunk boundary of a cadence-changing event. One or more other nodes 64 in the system can utilize the synchronization message from the node 50 for evaluating and, if needed, adjusting the synchronization of each such node(s) 64.

The synchronization control 60 can also include a message analysis function 86 that can be configured to extract and analyze the information in synchronization message that is received at the node 50 via the network 66, such as from one of the other nodes 64. The message analysis 86 can determine if the message is for nodes in the same node group to which the node 50 belongs, such as based on a group identifier or other header information in the received message. If the received message is intended to be processed by the node, the message analysis function 86 can provide the synchronization data to the synchronization logic 70.

The synchronization logic 70 can employ the rules 74 to ascertain whether the node 50 requires resynchronization based on the synchronization data obtained from another node 64. For example, the synchronization logic 70 can be configured to compare the time (e.g., time stamp) specified for the most recent the cadence-changing event at the other node 64 with the time of the most recent cadence-changing event at the node 50. In addition to the cadence-changing events, the synchronization logic 70 can also compare a next chunk boundary at the other node 64 with a next chunk boundary computed by the boundary calculator 72 for the node 50. The given node can then determine if it is out of synchronization with the other node(s) based on one or both comparisons. For example, if comparison indicates that cadence-changing event was more recent at the other node (e.g., remote_timestamp>local_timestamp), the synchronization logic 70 can determine that the node is out of synchronization.

The node 50 further can utilize either its own next chunk boundary or the next chunk boundary for the other node 64 depending on which node most recently experienced the cadence-changing event. If the synchronization logic indicates that the node 50 requires resynchronization based on synchronization parameters for the other node 64 being more up to date, the boundary calculator 72 can recompute a boundary location based on the rules to resynchronize based on the synchronization parameters (e.g., chunk boundary and cadence) provided in the synchronization message. The boundary calculator 72 can compute the chunk boundary locations for each video and each audio elementary stream. Each chunk boundary and the cadence can be stored as the local boundary data 56.

As mentioned, such local boundary data can be employed to send a synchronization message from the node 50 to each other node 64. The transcode engine 52 can then transcode each chunk of audio and video received from the media source based on the corresponding profile parameters and the computed local boundary data and, in turn, provide transcoded audio and video elementary streams. Each other node in a corresponding node group can be configured to operate and synchronize output data streams in a manner similar to as disclosed for the node 50.

Figure 3:
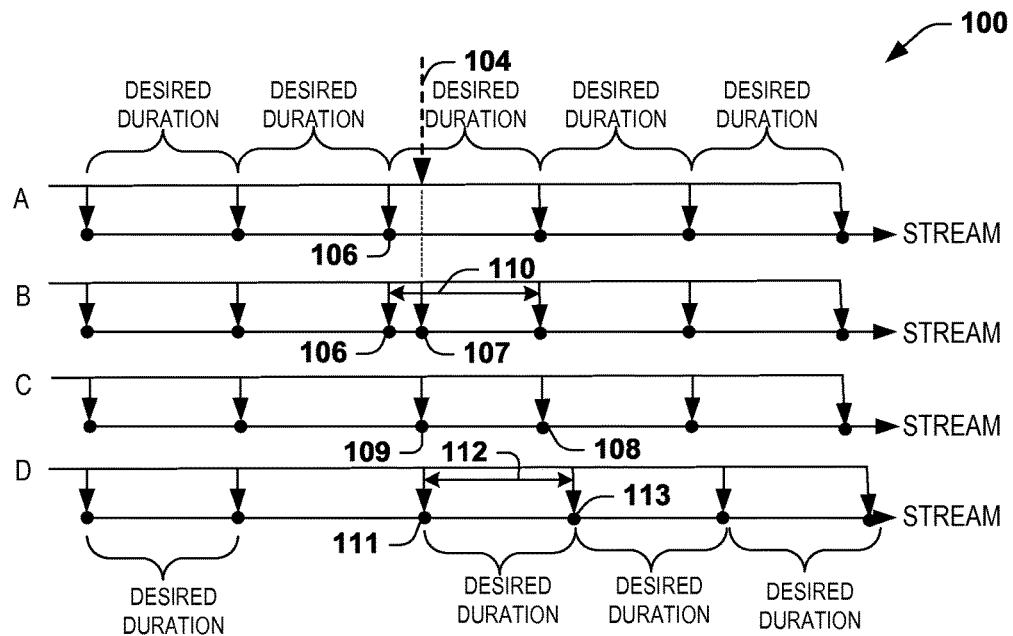
FIG. 3 is a diagram illustrating timing associated with a plurality of strings.
Figure 4:
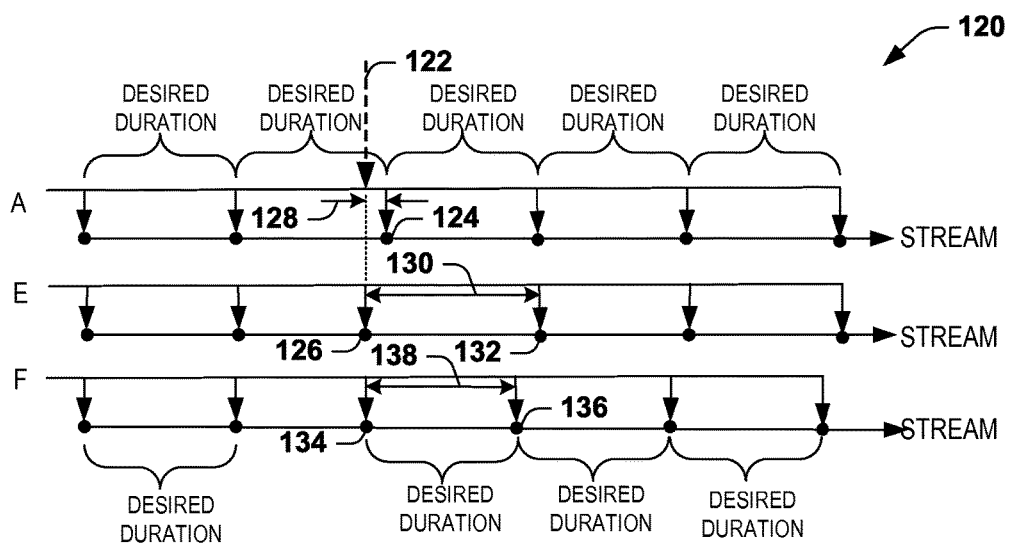
FIG. 4 depicts an example of another timing diagram illustrating an alternative synchronization approach.
Figure 5:
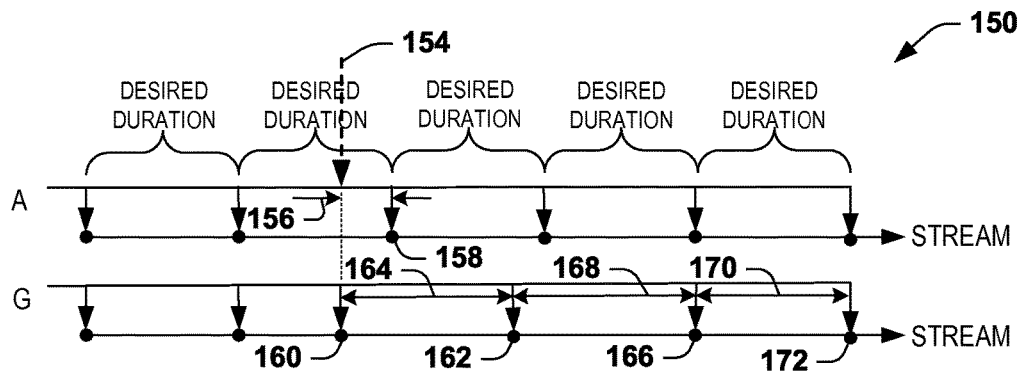
FIG. 5 is a timing diagram illustrating yet another example that can be utilized for adjusting chunk boundaries.

FIGS. 3-5 depict signal diagrams demonstrating some different example approaches that can be implemented (e.g., by machine readable instructions corresponding to synchronization control 16 and 18 of FIG. 1 or 60 of FIG. 2) to maintain synchronization. For example, the approaches in FIGS. 3-5 demonstrate cadence can be dynamically adjusted for one or more chunk boundaries of a data stream. Other approaches can be implemented based on this disclosure.

FIG. 3 depicts a signal diagram 100 that includes a plurality of streams demonstrated as streams A, B, C, and D. Stream A represents a fixed desired chunk duration and cadence as established at a given node (e.g. by synchronization logic 70 and stored as local boundary data 56 of FIG. 2). The occurrence of the cadence-changing event is demonstrated at 104 following a respective chunk boundary in signal A demonstrated at 106. Thus, in the representation of signal B, the chunk boundary at 106 can exist as well as a corresponding chunk boundary 107 that is associated with the cadence-changing event at 104. This can be undesirable as the adjacent chunk boundaries at 106 and 107 in stream B can adversely affect the user experience.

The example of stream C, however demonstrates the closest (expected) chunk boundary to the cadence-changing event at 104 having been removed and/or adjusted to provide a target chunk boundary into the stream at a time corresponding to the cadence-changing event 104. The next chunk boundary in stream C is demonstrated at 108 in alignment with the desired duration demonstrated at 110 from the expected chunk boundary at 106. Thus, in the example of stream C, each target boundary following the adjusted boundary at 109 is computed (e.g., by boundary calculator 72 of FIG. 2) to remain temporally aligned with the original target cadence of stream A in the absence of another cadence-changing event. Thus in the example of stream C two adjacent chunks have different durations than the expected desired duration.

In the example of stream D, a dynamic chunk boundary is placed at a location 111 corresponding to the cadence-changing event, but includes the next chunk boundary at 113 calculated (e.g., by the boundary calculator 72 of FIG. 2) to provide the desired duration, as demonstrated at 112. Thus, in this example, each subsequent chunk boundary following the cadence-changing event in stream D has the adjusted cadence, which provides the desired chunk duration offset from the originally established cadence according to the difference in the time stamp of the cadence-changing event and the closest expected chunk boundary, namely the preceding adjacent boundary 106.

FIG. 4 illustrates another example timing diagram 120 that includes streams A, E and F. The stream A is identical to the stream A in FIG. 3 and provides a baseline comparison of boundaries in the absence of dynamic adjustments in response to a cadence-changing event. In the example of FIG. 4, a cadence-changing event 122 occurs at a time when the closest next expected chunk boundary 124 (in stream A) is subsequent to the cadence-changing event 122. Stream E demonstrates a chunk boundary 126 placed at a location corresponding to the cadence-changing event, and that a corresponding chunk duration demonstrated at 130 is determined for placement of a next target chunk boundary 132. For example, the chunk duration 130 can be computed (e.g., by boundary calculator 72 of FIG. 2) based on the desired duration and the time difference between the time of cadence-changing event 124 and the following expected chunk boundary location demonstrated at 128. The difference 128 can be utilized to set the cadence for stream E. In the example of stream E, the chunk duration prior to and following the chunk boundary 126 at the cadence-changing event 122 are adjusted dynamically in response to the cadence-changing event.

In the example of FIG. 4, stream F demonstrates a chunk boundary 134 that is dynamically inserted at the location cadence-changing event 122. The subsequent chunk boundary at 136 is determined based on the chunk boundary at 134 and the desired duration associated with the stream (e.g., as provided by synchronization data). However, unlike stream E in which the chunk boundary at 132 and the remaining chunk boundaries remain aligned with the chunk expected boundaries of Stream A, the cadence and each of the chunk boundaries for Stream F, including at and following the cadence-changing event 122, are computed to provide the desired duration 138 but with an offset that is based on the difference 128. As a result, the approach in stream F can be implemented (e.g., by synchronization control 60) to dynamically modify only a single chunk duration, namely the chunk preceding the boundary location at 134.

FIG. 5 depicts another signal diagram 150 that includes streams A and G. Again, stream A corresponds to an unadjusted stream that has a fixed chunk duration and offset. In the example of FIG. 5, a cadence-changing event is demonstrated at 154 at a distance 156 from a closest expected chunk boundary 158. It is to be understood that in this context, the term distance refers to a temporal distance (e.g., units of time). In the example of FIG. 5, the synchronization rules (e.g., rules 74 of FIG. 2) can establish a prescribed tolerance for chunk duration relative to a desired chunk duration. For example, the rules can restrict the maximum chunk duration and/or a minimum chunk duration for the stream (e.g., within a predetermined percentage +/− of an established chunk duration).

In the example of FIG. 5, stream G is demonstrated as having a chunk boundary at 160 at a location corresponding to the cadence-changing event and a next chunk boundary at 162 providing an adjusted chunk duration demonstrated at 164. The rules thus can constrain the adjusted chunk duration 164 based on the tolerance restriction provided by the synchronization rules. As one example, a chunk duration may be required to be within +/−25% of the established (desired) target duration. The boundary calculator 72 thus can employ such rule to constrain computing the target duration 164 between adjacent chunk boundaries 160 and 162. The boundary calculator 72 can maintain such restrictions for each subsequent boundary until a next chunk boundary 166 is aligned with the expected chunk boundary of Stream A. As a result, the chunk duration 168 between chunk boundaries 162 and 166 can exceed the desired duration. However, the subsequent chunk boundary duration 170 is equal to the desired chunk duration. Further, subsequent chunk boundaries can remain aligned with the established cadence in the absence of the occurrence of a cadence-changing event.

Figure 6:
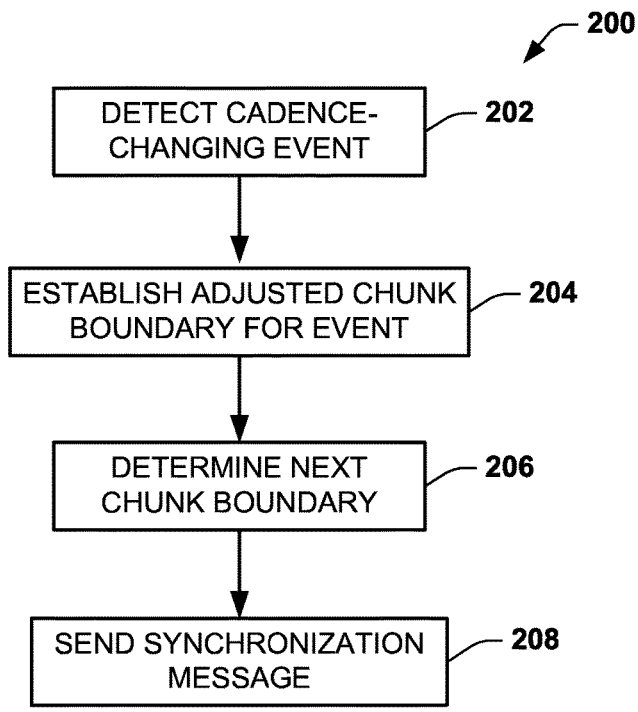
FIG. 6 is a flow diagram depicting a method for adjusting chunk boundaries.
Figure 7:
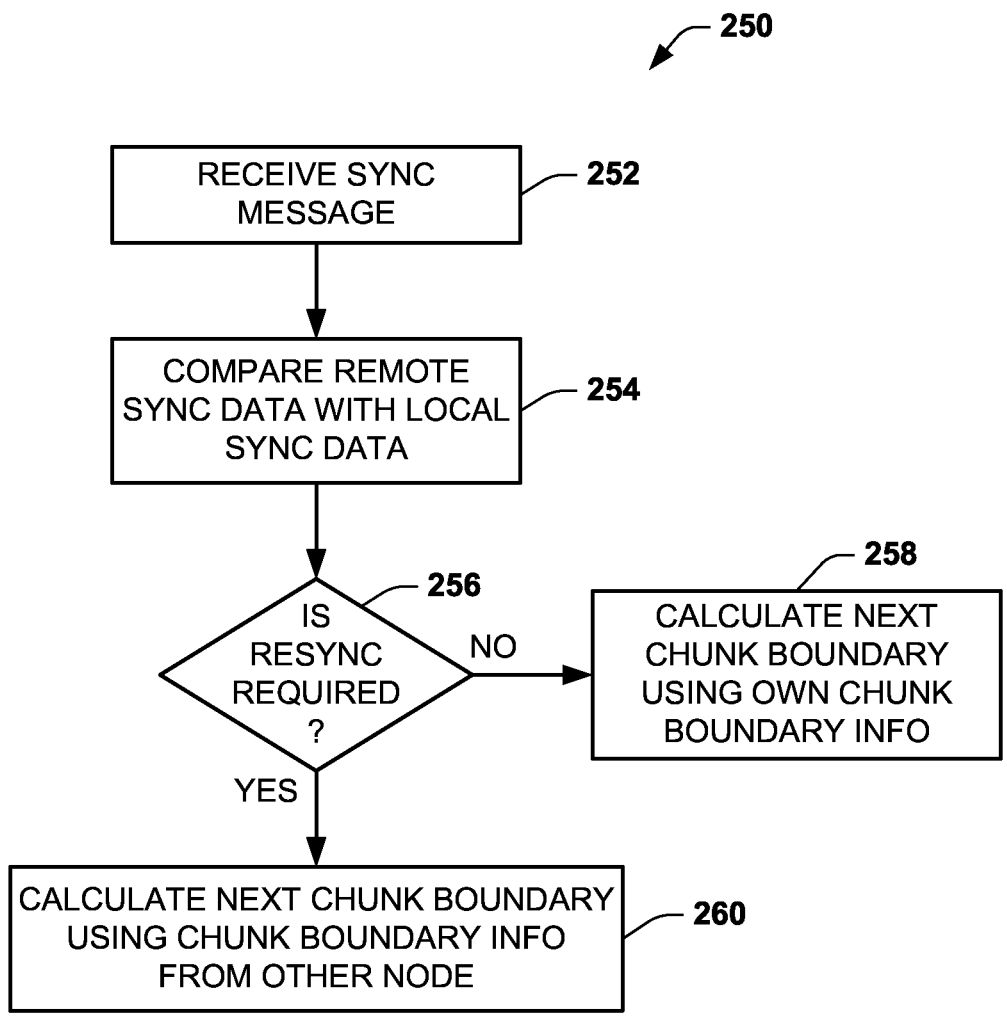
FIG. 7 is a flow diagram depicting a method that can be utilized for synchronizing chunk boundaries among the plurality of nodes.

In view of the foregoing structural and functional features described above, methods that can be implemented will be better appreciated with reference to FIGS. 6 and 7. While, for purposes of simplicity of explanation, the methods of FIGS. 6 and 7 are shown and described as executing serially, it is to be understood and appreciated that such methods are not limited by the illustrated order, as some aspects could, in other examples, occur in different orders and/or concurrently with other aspects from that disclosed herein. Moreover, not all illustrated features may be required to implement a method. The methods or portions thereof can be implemented as instructions stored in a non-transitory machine readable medium as well as be executed by a processor of a computer device, for example.

FIG. 6 depicts an example of a method that 200 can be implemented by a plurality of nodes for providing for variable chunk boundaries in an ABR system (e.g., the system 10 of FIG. 1). The method begins at 202 in which a cadence-changing event is detected. As disclosed herein, the cadence-changing event can be detected (e.g., by detector 82) via in-band or out-of-band-signaling or based on processing of data to determine the occurrence of the event.

At 204, an adjusted chunk boundary for the event can be established. This can result in dynamic chunk boundary placement at the time specified for the cadence-changing event. The adjusted chunk boundary can be stored as local boundary data for placement in the respective stream (e.g., by transcode engine 52 of FIG. 2). In some examples, a closest scheduled chunk boundary location to the cadence-changing event can be identified, such as for replacing an expected chunk boundary location that is closest to the cadence-changing event based on comparing time stamps of pre-computed chunk boundary locations and the cadence-changing event.

At 206, a next chunk boundary can be determined (e.g., by boundary calculator 72 based on rule 74 of FIG. 2). The placement of the next chunk boundary can be determined depending on the type and format of the ABR stream and other application requirements, such as disclosed herein. In some examples, synchronization control can be configured to maintain chunk duration at a desired established duration by adjusting the previous cadence according to a determined offset. In other examples, synchronization control can be configured to re-establish and maintain alignment of chunk boundaries with desired established boundary locations based on established cadence.

Additionally, at 208 the node implementing the method 200 can send a synchronization message in response to the cadence-changing event detected at 202. The synchronization message can include synchronization information that specifies a time (e.g., time stamp) for the cadence changing event as well as a most recent chunk boundary location. The synchronization message can be a multicast message that is sent to each other node in a group of nodes to help maintain synchronization for respective output data streams provided from each node, for example.

FIG. 7 depicts an example of part of a method 250 that can be implemented to provide for synchronization between nodes (e.g., encoders and/or transcoders). For example, the nodes may form at least a portion of a node group configured for synchronizing chunks of data from an output stream as disclosed herein. The method 250 begins at 252 in response to receiving a synchronization message. For example, a given node can receive a synchronization message from one or more other nodes operating in a corresponding group of nodes associated with a respective service (e.g., a video service). The synchronization message can include synchronization data for one or more other nodes, referred to as remote nodes. The term remote does not require that node be located at any particular distance from the recipient node, only that it be different. For example, a local recipient node and one or more remote nodes can reside in the same device or rack or they can be distributed across a large geographical region (e.g., a state or country).

At 254, the recipient node can compare the remote synchronization data with local synchronization data of the recipient node. At 256, a determination can be made if resynchronization is required. This determination 256 can be based on the comparison at 254. For example, the recipient node can compare the timestamp associated with the most recent cadence-changing event at the other remote node with a corresponding timestamp associated with a most recent cadence-changing event at the recipient node. Such comparison further can include comparing a next chunk boundary at the given recipient node with the next chunk boundary at the other remote node based on the data identifying the chunk boundary for the other node. Additionally or alternatively, the comparison can include comparing one or more other synchronization parameters with respective parameters from the other node. If the comparison results in a match of timing information for both the cadence-changing event and the next determined chunk boundary, the node can be determined to be in synchronization with the other node. If one or both of the comparisons results in a negative determination in which one or both timestamps and/or one or more other synchronization parameters are not equal, the given node may be out of synchronization.

A need for resynchronization can be determined by the recipient, for example, depending on which node most recently experienced the cadence-changing event. Stated differently, if the recipient node determines (based on a comparison of synchronization information) its most recent cadence-changing event is to occur at a time that is greater (more recent) than the other node that sent the synchronization message, the recipient node can ascertain that resynchronization is not required to be performed by such node, and the method can proceed to 258. At 258, the recipient node can calculate its next chunk boundary using its own chunk boundary information (e.g., as determined by synchronization logic 70 of FIG. 2). However, if the time stamp for the cadence-changing event in the synchronization message is greater (more recent) than the time stamp for the most recent cadence-changing event at the recipient node, as determined from the synchronization message at 252, synchronization can be required and the method proceeds to 260. At 260, the recipient node can calculate its next chunk boundary based on the remote boundary information (e.g., chunk boundary location and cadence) that is received in the synchronization message from the other node. Each node operating in the group of nodes can implement the same methods (e.g., in FIGS. 6 and 7) to maintain synchronization and chunk boundary locations.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on.

What is claimed is:

1. A method comprising:
   detecting, at a first network node, a cadence-changing event for a stream of data, the stream of data being provided in chunks having associated chunk boundaries according to an established cadence, wherein the cadence-changing event cuts short a chunk boundary;
   receiving a synchronization message from a second network node, the synchronization message specifying a first time associated with a most recent cadence-changing event at the second network node;
   comparing a second time associated with the cadence-changing event detected at the first network node with the first time associated with the most recent cadence-changing event at the second network node;
   determining, based on comparing the second time, whether the second time is more recent than the first time; and
   establishing, in response to determining that the second time is more recent than the first time, an adjusted chunk boundary at a location using the cadence-changing event, wherein establishing the adjusted chunk boundary comprises:
   inserting the adjusted chunk boundary at the location that is different from a scheduled chunk boundary,
   removing a closest scheduled chunk boundary determined as being closest to the cadence-changing event in the stream of data,
   adjusting a subsequent scheduled chunk boundary by an offset comprising a difference between the scheduled chunk boundary and the adjusted chunk boundary,
   inserting a boundary identifier at the adjusted chunk boundary, and
   sending at least one synchronization parameter comprising the second time as a time stamp of the most recent cadence-changing event to a third network node, wherein the third network node is operable to determine whether resynchronization of the third network node is required based on the at least one synchronization parameter.

2. The method of claim 1, further comprising calculating a chunk duration from the location corresponding to the cadence-changing event to a next chunk boundary that is aligned with the established cadence.

3. The method of claim 2, wherein chunks subsequent to the adjusted boundary remain temporally aligned with the established cadence in the absence of another cadence-changing event.

4. The method of claim 1, further comprising determining a distance from the location corresponding to the cadence-changing event instead of from the closest scheduled chunk boundary.

5. The method of claim 4, further comprising applying synchronization rules to control how to change the cadence based on the determined distance.

6. The method of claim 4, calculating an adjusted cadence having the offset from the established cadence based on the determined distance to provide the data stream with subsequent boundary locations set according to the adjusted cadence.

7. The method of claim 1, further comprising:
calculating a target chunk duration from the location corresponding to the cadence-changing event to a next chunk boundary that is at the established cadence; and
adjusting the target chunk duration if the target chunk duration exceeds a prescribed tolerance to realign the chunk boundary with the established interval and cadence over one or more subsequent chunks.

8. The method of claim 1, further comprising:
receiving the at least one synchronization parameter at the third network node; and
determining whether the resynchronization of the third network node is required based on the at least one synchronization parameter.

9. The method of claim 8, wherein the at least one synchronization parameter comprises first cadence data specifying the second time associated with the most recent cadence-changing event at the first network node and first remote boundary data identifying at least one chunk boundary at the first network node.

10. The method of claim 9, further comprising:
comparing the second time associated with the most recent cadence-changing event at the first network node with a third time associated with a most recent cadence-changing event at the third network node; and
determining whether the third network node is out of synchronization with the first network node based on the comparisons.

11. The method of claim 1, further comprising receiving an input signal at the network node to enable the detection of the cadence-changing event, wherein the cadence-changing event comprises one of a scene change, a splice input, a change in input source for the data stream.

12. The method of claim 1, wherein establishing the adjusted chunk boundary further comprises placing a boundary identifier access unit at the adjusted chunk boundary of the data stream.

13. A system comprising:
an inter-node communications link to provide communications between a plurality of nodes in a node group that is associated with a service; and
a first network node of the plurality of nodes, the first network node comprising a processor configured to:
detect a cadence-changing event for a data stream, wherein the cadence-changing event cuts short a chunk boundary;
receive a synchronization message from a second network node, the synchronization message specifying a first time associated with a most recent cadence-changing event at the second network node;
compare a second time associated with the cadence-changing event detected at the first network node with the first time associated with the most recent cadence-changing event at the second network node;
determine, based on the comparison, whether the second time is more recent than the first time; and
dynamically adjust, in response to determining that the second time is more recent than the first time, the chunk boundary for the data stream in response to detecting the cadence-changing event, wherein the processor being configured to adjust the chunk boundary further comprises the processor being configured to:
insert an adjusted chunk boundary at the location that is different from a scheduled chunk boundary,
remove a closest scheduled chunk boundary determined as being closest to the cadence-changing event in the data stream,
adjust a subsequent scheduled chunk boundary by an offset comprising a difference between the scheduled chunk boundary and the adjusted chunk boundary,
insert a boundary identifier at the adjusted chunk boundary, and
send a synchronization message to a third network node via the inter-node communications link, the synchronization message including synchronization data that specifies a parameter associated with the cadence-changing event detected by the first network node, wherein the third node is configured to determine whether resynchronization of the third network node is required based on the parameter.

14. The system of claim 13, wherein the third network node is configured to determine whether resynchronization is required at the third network node based on evaluating the synchronization data received in the synchronization message from the first network node relative to local data of the third network node.

15. The system of claim 13, wherein the processor is further configured to determine a distance from a location corresponding to the cadence-changing event and the closest expected chunk boundary, and to apply synchronization rules to control how to change the cadence based on the determined distance.

16. An apparatus comprising:
a memory storage; and
a processing unit coupled to the memory storage, wherein the processing unit is operative to:
detect a cadence-changing event for a stream of data, the stream of data being provided in chunks having associated chunk boundaries according to an established cadence, wherein the cadence-changing event cuts short a chunk boundary;
receiving a synchronization message from a second network node, the synchronization message specifying a first time associated with a most recent cadence-changing event at the second network node;
comparing a second time associated with the cadence-changing event detected at the first network node with the first time associated with the most recent cadence-changing event at the second network node;
determining, based on comparing the second time, that the second time is more recent than the first time; and
establish, in response to determining that the second time is more recent than the first time, an adjusted chunk boundary at a location corresponding to the cadence-changing event, wherein the processing unit being operative to establish the adjusted chunk boundary comprises the processing unit being operative to;

insert the adjusted chunk boundary at the location that is different from a scheduled boundary, remove a closest scheduled chunk boundary determined as being closest to the cadence-changing event in the stream of data, adjusting a subsequent scheduled chunk boundary by an offset comprising a difference between the scheduled chunk boundary and the adjusted chunk boundary, insert a boundary identifier at the adjusted chunk boundary, and send at least one synchronization parameter comprising a time stamp of a most recent cadence-changing event to a third apparatus, wherein the third apparatus is operable to determine whether resynchronization of the third apparatus is required based on the at least one synchronization parameter.

17. The apparatus of claim 16, wherein the processing unit is further operative to calculate a chunk duration from the location corresponding to the cadence-changing event to a next chunk boundary that is aligned with the established cadence.

18. The apparatus of claim 17, wherein chunks subsequent to the adjusted boundary remain temporally aligned with the established cadence in the absence of another cadence-changing event.

* * * * *